Aug. 28, 1934.   E. C. FURMAN ET AL   1,971,650
DRILLING AND INJECTING APPARATUS
Filed Dec. 30, 1933   2 Sheets-Sheet 1
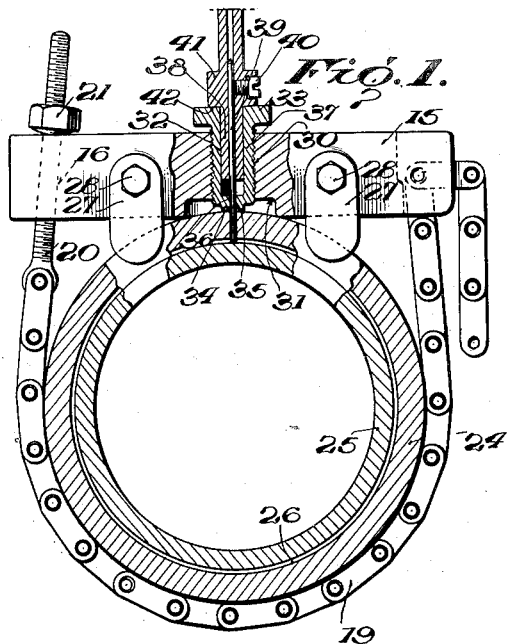
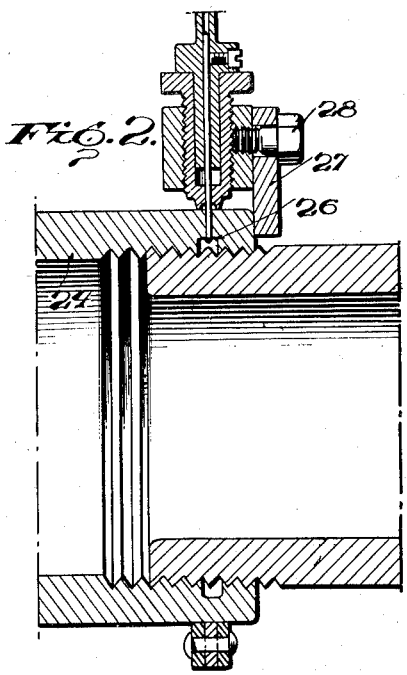
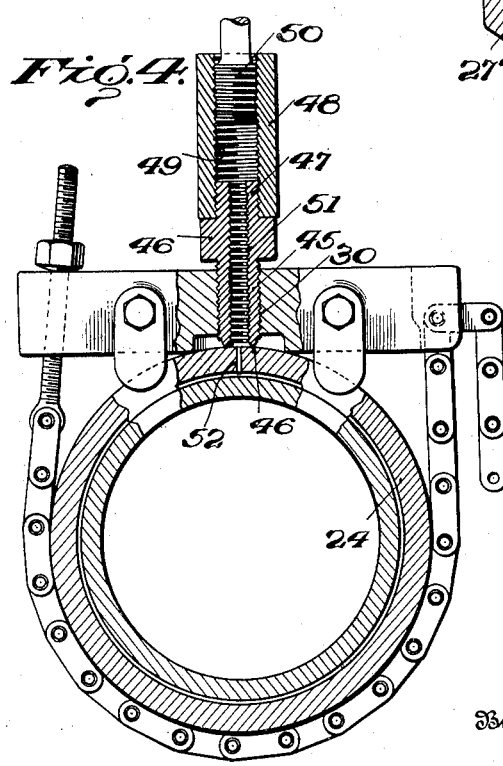
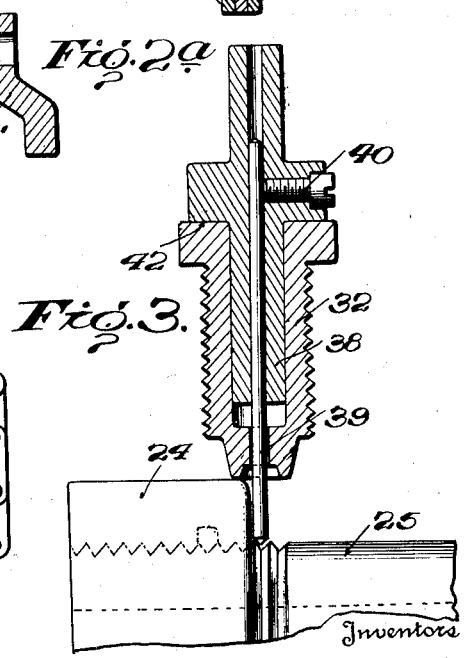
Inventors
Eugene C. Furman
Edmund F. Heard
By Cameron, Kerkam + Sutton
Attorneys Aug. 28, 1934.  E. C. FURMAN ET AL  1,971,650
DRILLING AND INJECTING APPARATUS
Filed Dec. 30, 1933  2 Sheets-Sheet 2
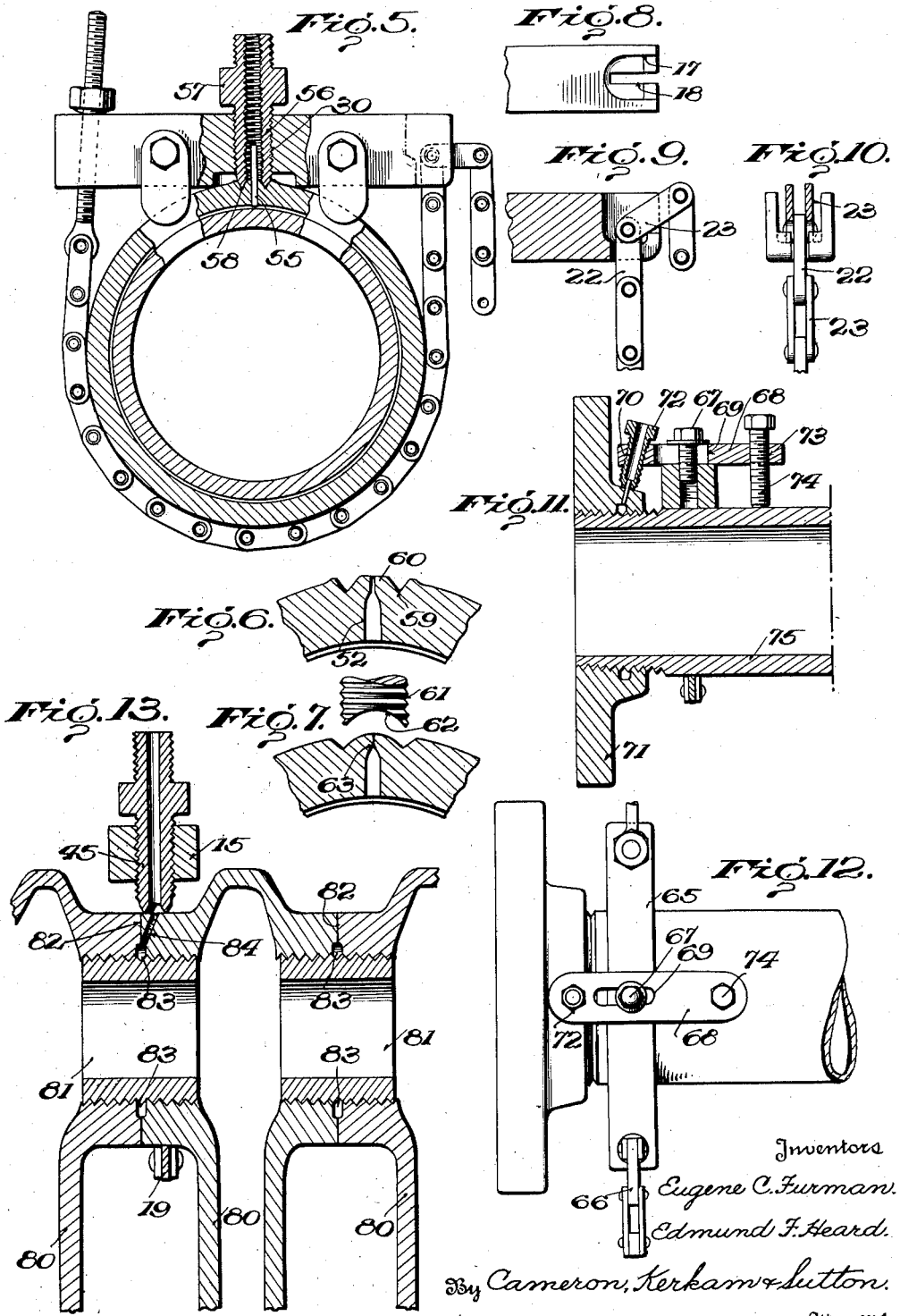

Patented Aug. 28, 1934

1,971,650

UNITED STATES PATENT OFFICE 1,971,650

DRILLING AND INJECTING APPARATUS

Eugene C. Furman, Newport News, and Edmund F. Heard, Hampton, Va.

Application December 30, 1933, Serial No. 704,741

20 Claims. (Cl. 29—26)

This invention relates to apparatus for injecting fluids into threaded joints.

In our co-pending application Serial No. 670,778, filed May 12, 1933, and entitled Method of sealing leaks in threaded joints, we have disclosed and claimed a method whereby a leaking threaded joint may be sealed without varying the pressure interiorly of the joint, where one of the elements of the joint is preliminarily provided within the area of its threaded surface with a circumferential groove or one or more sections of a circumferential groove at a location determinable from the exterior of the joint, by providing a hole from the exterior of the outer element of the joint to said groove or groove section, and then injecting a fluid or semi-fluid sealing medium into said hole and groove or groove section under a pressure sufficient to overcome the pressure interiorly of the joint and force the sealing medium into the intersurface spaces through which the leak is occurring, thereafter retaining the pressure on said sealing medium until it hardens in place by chemical or thermal action.

In our application Serial No. 704,738, entitled Method for sealing leaks in threaded joints, and filed of even date herewith, we have also disclosed a method for sealing leaks in threaded joints which are not provided preliminarily with a groove or groove section, but which also involves the provision of an aperture from the exterior of the joint to the threaded surfaces thereof.

Also, in our application Serial No. 704,739, entitled Method of loosening rusted threaded joints, and filed of even date herewith, we have disclosed a method whereby threaded joints the elements of which have become rusted or "frozen" together can be loosened so that said elements may be readily separated without destroying or injuring the same or the threads thereof and which also involves the provision of an aperture from the exterior of the joint to the threaded surfaces thereof.

Furthermore, in our application Serial No. 704,740, entitled Method for sealing apertures, and filed of even date herewith, we have disclosed a method whereby the aperture formed in the elements of threaded joints in the practice of the methods of any of the foregoing applications, as well as for other purposes, may be sealed, either with or without the use of a plug in said aperture, so that the elements of the joint may be subsequently dismantled and used over again without danger of leakage by reason of the presence of such an aperture therein.

It is an object of the present invention to provide an apparatus which may be used in the practice of any one or more of the methods of the foregoing applications and which is simple in construction, easy to install and manipulate, and capable of use without need of highly skilled labor.

Another object of this invention is to provide an apparatus which may be used for drilling an aperture through the outer element of a threaded joint and for injecting a fluid or semi-fluid medium through said aperture and between the threaded surfaces of said joint, whether said medium be used for sealing leaks in the joint, as in the first two applications above referred to, or whether said medium be used to loosen rusted threaded surfaces, as in the third of the applications above referred to.

Another object of this invention is to provide an apparatus of the type just characterized which may be used with threaded joints that have been preliminarily provided with an internal groove or groove section, as disclosed in the first and third of the applications above referred to, and which will assure that the aperture formed in the outer joint element will intersect with the internal groove even though there be no exterior indication as to the location of the interior groove.

Another object of this invention is to provide a device of the type characterized which is readily adjustable for use with threaded joints of different shapes and character as well as of different sizes.

Another object of this invention is to provide a device of the type characterized wherein the drill is so guided as to minimize the danger of its breakage by reason of lateral stresses being imposed thereon during the drilling operation.

Another object of this invention is to provide an apparatus of the type characterized which includes means that assure against the drill piercing the inner element of the threaded joint.

Another object of this invention is to provide an apparatus of the type characterized wherein the same rig that is set up for locating and guiding the drilling operation may also be used for locating the injecting mechanism in proper alinement with the aperture that has been formed.

Another object of this invention is to provide an apparatus of the type characterized wherein the same rig that has been set up for locating the drilling and injecting mechanisms may also be used for sealing the aperture by any of the procedures of the fourth of the applications above referred to.

Another object of this invention is to provide an apparatus of the type characterized which may be used with equal facility where the threaded joint is not preliminarily provided with a groove or groove section and either for injecting a sealing medium or a medium for loosening rusted surfaces and either with or without subsequent operations for sealing the aperture as heretofore referred to.

Another object of this invention is to provide an apparatus of the type characterized which does not require the use of highly skilled labor, which is light and compact so that it may be readily transported and installed, and which is simple and inexpensive in construction.

Another object of this invention is to provide an apparatus of the type characterized which may be used with joints that have a radially extending wall at or adjacent to the threaded joint.

Other objects will appear as the description of the invention proceeds.

The invention is capable of receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

Referring in detail to the accompanying drawings, wherein the same reference characters are employed to designate corresponding parts in the several figures, Fig. 1 is an end elevation, partly in section, illustrating the use of the apparatus of the present invention for drilling an aperture through the outer element of a threaded joint;

Fig. 2 is a section at right angles to Fig. 1 to show more particularly the operation of the positioning elements;

Fig. 2a is a detail of a different form of positioning element;

Fig. 3 is a schematic view to illustrate the positioning of the drill so that it will not puncture the inner threaded element;

Fig. 4 is a view corresponding to Fig. 1 but illustrating the use of the injecting mechanism;

Fig. 5 is a view corresponding to Figs. 1 and 4 but illustrating the use of the aperture-sealing mechanism;

Figs. 6 and 7 are fragmentary schematic views illustrating successive steps in a method of sealing the aperture which does not employ a plug or pin therein;

Figs. 8, 9 and 10 are fragmentary views illustrating respectively in plan, side section and end view, the device for locking the flexible chain in the end of the clamp bar;

Figs. 11 and 12 are respectively an axial section and a plan view of an alternative embodiment of the apparatus; and Fig. 13 is a fragmentary sectional view of a radiator to illustrate the apparatus of the present invention in use for sealing a leak at a radiator joint.

Referring first to Figs. 1, 2 and 3, the apparatus of the present invention as shown includes a clamp bar 15 provided adjacent one end thereof with an aperture 16, and at the opposite end thereof with a recess 17 into the bottom of which extends an open-ended slot 18 (see Fig. 8). Clamp bar 15 is designed to be secured to the periphery of the outer element of a threaded joint and, in order that the apparatus may be used with threaded joints of different diameter, contour, construction, character, etc., the means for securing said clamp bar in position is preferably flexible and adjustable in length. While this result may be effected in a variety of ways, the preferred construction comprises a flexible chain 19 which is attached at one end to a threaded stem 20 that projects through the aperture 16 and carries at its outer end an adjustable nut 21. As here shown the chain is composed of alternate single and double links 22 and 23, respectively, and the recess 17 in the clamp bar 15 is of such size that it is adapted to receive and retain a double link 23 (see Figs. 9 and 10) while the slot 18 communicating with the bottom of said recess will admit only a single link 22 (see Figs. 8, 9 and 10). Therefore, as shown in Fig. 1, the clamp bar 15 may be positioned against the periphery of a threaded joint at a conveniently accessible location, and the flexible chain 19 may be wrapped therearound as tightly as is permitted by the need to insert a single link 22 into the open-ended slot 18, the remainder of the chain being permitted to hang out of the recess 17 as shown in Fig. 1. In this position the double link 23 beyond the single link 22 that is engaged in said slot 18 is locked in the recess 17 (see Fig. 9) against dislodgment therefrom. The nut 21 is then tightened until the chain 19 securely grips the clamp bar 15 against the periphery of the threaded element.

In the embodiment of the invention illustrated in Figs. 1, 2 and 3, the threaded joint is composed of an outer element 24 and an inner element 25 with a groove 26 formed in the outer element, approximately midway of the axial length of the engaged threaded surfaces, as disclosed for example in our application Serial No. 670,778 above referred to. As explained in said application, groove 26 may be located at a predetermined distance from the end of the joint element 24, the position of said groove being indicated on the joint element, as by indicating in distance units the spacing of the groove from the end of the joint element or by providing the joint element with exterior indicia in radial alinement with the groove. To avoid the need for such external markings, however, it is preferred to provide said groove at a standardized distance from the end of the threaded element 24 and to provide the clamp bar 15 with means which will so locate the position of said clamp bar that the aperture formed in the outer joint element, as hereinafter explained, will intersect groove 26. As here shown, clamp bar 15 carries a pair of positioning elements 27 which are suitably attached thereto as by bolts or screws 28 and which are so designed by reason of their thickness, shape, etc., that when said positioning elements 27 engage the end of the outer joint element 24, as illustrated in Fig. 2, the drill will intersect the groove 26. If it is desirable to provide the groove 26 at different distances from the ends of outer joint elements 24 in the case of different sized joints or joints used for different purposes, different sets of locating elements 27 may be provided so that by variations in thickness or shape (see 27' in Fig. 2a), they will properly locate the clamp bar 15 for the different sizes or characters of joints on which the clamp bar is to be mounted—any suitable table or indicia being provided to instruct what positioning elements are to be used in the case of different sizes or characters of joints.

Intermediate its ends clamp bar 15 is provided with a threaded aperture 30 which leads to a recess 31 at the inner face of said bar. Recess 31 is preferably provided so that when an aperture is being drilled the fact that the drill has passed through the outer of the joint elements may be indicated visually by the escape of liquid from the interior of the joint, which becomes visible at said recess 31, or by the escape of gas from the interior of said joint, which is rendered visible by the formation of bubbles in a liquid which may be applied to the exterior surface of the joint at said recess 31. If preferred, however, recess 31 may be omitted and the inner face of the clamp bar 15 suitably shaped so as to substantially conform with the periphery of the joint element.

For the drilling operation a combined jig and guide member 32, having a threaded shank for engaging in said aperture 30 and a shouldered head 33 so that it may be readily manipulated by a wrench, is threaded into the aperture 30 until its inner end 34, which may be provided with a recessed annular contact portion 35, is in snug engagement with the periphery of the joint element 24. End 34 is also provided with an aperture 36 of substantially the same diameter as that of the drill to be used. Element 32 has a cylindrical bore 37 of substantially the same diameter as that of the periphery of the drill holder 38, so that as drill holder 38 enters the bore 37 said drill holder is guided in a straight line while, at the same time, the drill 39 is guided adjacent its entry into the joint element by its rotary engagement in the aperture 36, to the end that the drill is protected against the imposition of severe lateral stresses likely to cause breakage of the same. The drill 39, which may be of any suitable character and material and is of any suitable size but preferably on the order of $\frac{1}{16}$ of an inch in diameter, may be retained in the drill holder 38 in any suitable way, as by the set screw 40. Drill holder 38 is preferably provided with an enlarged portion 41 so as to form a shoulder 42 adapted to engage the outer face of the head 33 of member 32, for the purpose next to be explained.

To position the drill 39 in its holder 38 so that it will properly pierce the outer joint element 24 but not enter substantially into or injure the inner joint element 25, the drill 39 is loosened in the holder, by releasing the set screw 40, and with the shoulder 42 of the drill holder 38 in engagement with the end of the guide element 32, element 32 is engaged with the outer periphery of outer joint element 24, as shown in Fig. 3, with the end of the drill in engagement with the outer periphery of the inner joint element 25. In this position the set screw 40 is tightened, and thereby the drill 39 is given such a projection beyond the end of the element 32 that when said element 32 is in firm contact with the outer joint element 24 and the shoulder 42 is brought to a stop against the outer end of the element 32, drill 39 will have just passed through the outer joint element 24 but cannot enter the inner joint element 25.

Drill holder 38 and drill 39 may be driven in any suitable way as by an electric motor, a hand brace, etc. When the joint is provided with a groove 26 no particular care need be exercised in performing the drilling operation, as with the mounting of the clamp bar 15 on the periphery of the joint element 24 with the positioning elements 27 engaged with the end of joint element 24 and the extent of projection of the drill determined as above explained, the drill will intersect with the groove 26 and not pierce the inner joint element. If, however, the apparatus is used to drill an aperture into a threaded joint that is not provided with an interior groove or groove section 26, whether for injecting a sealing medium or a medium for loosening rusted surfaces, care must be exercised to avoid the raising of a burr at the junction of the aperture with the threaded surface of the outer joint element 24, as explained in our application Serial No. 704,738, above referred to, and in that event the drilling operation should be carried out in the careful manner there explained.

A hole having been drilled through the outer joint element 24, as heretofore explained, the combined jig and guide member 32 is removed from the clamp bar 15 and, without disturbing the position of the latter, an injection nozzle 45, having a threaded shank corresponding with the aperture 30 and an enlarged portion 46 so that it may be readily manipulated by a wrench, is then threaded into the aperture 30. Nozzle 45 may have at its inner end a relatively soft or deformable surface so that when pressure is exerted thereon the end of the nozzle will shape itself to conform with the periphery of the joint element 24, as disclosed in our application Serial No. 670,778 above referred to, or the end of the nozzle may be provided with a hardened and sharpened edge portion 46 that is adapted to bite into the metal of the joint element 24. The outer end of nozzle 45 has a threaded portion 47 adapted to receive the barrel 48 of an injection device, here shown as having an interiorly threaded bore 49 and a threaded plunger 50. A leak sealing medium or a medium for loosening rusted surfaces, such as a penetrating oil, having been placed in the bore of the injection device, as the case may be, the plunger 50 may be threaded into the cylinder 48 in any suitable way and by any suitable mechanism to force the medium therein through the bore 51 of the injection nozzle, and thence through the aperture 52 into the groove 26, when provided, and between the threaded surfaces, as fully disclosed in our applications above identified. It will be noted that inasmuch as the clamp bar 15 has not been removed or displaced, the nozzle 45 is in centered relation with the aperture 52, and therefore it is only necessary to thread the nozzle into the aperture 30 until its end has made suitable contact with the periphery of the joint element 24 to insure that the nozzle is in proper position for the injection of the contained medium into the aperture 52.

When a sealing medium is injected into the joint and permitted to harden, by chemical or thermal action, to seal the leak, as explained in the first two applications above identified, said sealing medium also closes the aperture 52 and constitutes a permanent plug therein. However, if the joint is subsequently dismantled, said plug may become broken or loosened, so that upon reassembly of the joint there would be danger of leakage at the aperture. Therefore it is preferred to permanently seal the aperture 52 so that the joint elements may be dismantled and reassembled. This procedure is also desirable if the aperture is formed for the purpose of injecting a penetrating oil, so that the joint elements may be used over again. The apparatus of the present invention enables the aperture 52 to be sealed metallically without removing or displacing the clamp bar 15.

According to one procedure, a cylindrical or slightly tapered pin or plug 55 which snugly fits the aperture 52 is inserted or driven into said aperture while the injection nozzle is removed, and then the metal around the aperture 52 is calked or displaced inwardly so as to tightly clamp said pin 55—after which the pin 55 is cut off flush with the surface and if preferred the metal around said plug may be further peened so as to additionally secure the pin in the aperture. While the calking operation may be effected by a hollow hammer-operated calking tool, we prefer to perform this operation by a rotary calking tool. If the inner end of the injection nozzle 45 is properly hardened and sharpened it may be used as the rotary calking tool, or a separate calking tool may be used, as illustrated in Fig. 5, said tool having a threaded shank 56 adapted to fit the threaded aperture 30 and an enlarged head portion 57 whereby it may be gripped and manipulated by a wrench. At its inner end the calking tool has a hardened and sharpened edge 58 so that when, by rotary action, the sharpened edge is forced into the metal, by threading the shank 56 into the aperture 30, the metal around the pin 55 is distorted and displaced inwardly so as to firmly grip the pin 55 and lock the same in position. If after the pin is cut off flush with the periphery of the element 24 a peening operation is used, a hammer-operated peening tool or the rotary peening tool hereafter described may be employed.

Sometimes it is preferred to effect the sealing operation without the introduction of a pin or plug. In this event a calking tool, whether rotary or hammer-operated, is forced into the metal as shown in Fig. 6 so as to form a groove 59, simultaneously deflecting and distorting the metal around the aperture 52 so as to nearly if not completely close the mouth of said aperture as shown at 60. The metal so deflected inwardly is then preferably subjected to a peening operation, preferably by a rotary peening tool although a hammer-operated peening tool may be used if preferred. To this end, as shown in Fig. 7, a threaded shank 61 having a concave end 62 and adapted to be threaded into the aperture 30 is forced against the metal at 60, and by combined pressure and rotary action the metal around the mouth of the aperture 52 is compressed and distorted into a fluid-tight seal, as shown at 63 in Fig. 7. This procedure has the advantage that the aperture 52 need not be cleaned of contained sealing medium before the aperture is closed, as is the case when a pin has first to be inserted in said aperture.

Some types of threaded joints are of a character that do not readily permit the use of a clamp bar 15. Furthermore, the use of a clamp bar of the character shown at 15 becomes of less moment if the joint elements are not provided with an internal groove so as to necessitate a definite location of the aperture through which the sealing medium or the penetrating oil is to be injected. Also, even when a groove is used if its location can be readily determined by measurement or by external indicia, a clamp bar of the character shown at 15 is not as important. Figs. 11 and 12 disclose a rig which can be used when such a clamp bar as shown in the embodiment of Figs. 1 to 10 cannot be used or is not needed to properly locate the drilling jig, injection nozzle, etc.

As here shown, the clamp bar 65, which may be clamped around one of the joint elements in any suitable way, preferably by a flexible chain 66 of the character described in conjunction with the embodiment of Figs. 1 to 10, has secured thereto intermediate its length, as by a bolt 67, a transverse bar 68 provided with a slot 69 so that when bolt 67 is loosened said bar 68 may be adjusted in the direction of the axis of the joint. Adjacent one end of said bar 68 is a threaded aperture 70, preferably at an angle to the bar 68 as illustrated, so that access may readily be gained thereto when the apparatus is to be used in conjunction with a joint having a radially extending wall 71 at or adjacent to the threaded joint. Aperture 70 is adapted to receive a drilling jig and guide member, injection nozzle, calking tool, peening tool, etc., as in the embodiment heretofore described, a jig and guide member 72 being illustrated in position. Adjacent its opposite end bar 68 has a threaded aperture 73 through which passes a bolt 74 adapted to be set up firmly against the periphery of the joint element 75 so that the reaction at the inner end of the bar 68, whether during the drilling operation or the injecting operation or the calking or peening operations, will not tilt said bar 68 with respect to the bar 65.

Referring now to Fig. 13, the apparatus of the present invention is illustrated as applied to the sealing of a leak in a radiator. A plurality of radiator sections 80 are shown as united by conventional ferrules 81 and forming joints at 82. Each joint face is here shown as grooved at 83, as is common practice, and in originally installing the radiator red lead or white lead paste is applied to said grooves 83 to seal the joint between the radiator sections. In time the sealing material in the grooves 83 is likely to shrink and crack, and the heating medium may then escape between the surfaces of joint 82.

Upon the occurrence of such a leak a hole may be drilled through one of the radiator sections or both of the radiator sections adjacent the leaky joint 82, and such aperture or apertures may extend at right angles to the axis of the ferrule so as to break into the threaded surface, or an aperture may be made at an angle so as to break into the groove 83 as shown at 84 in Fig. 13. Such a hole may be drilled by apparatus of the character heretofore described, a special clamp bar 15 provided with an inclined aperture 30 being provided for use in handling leaks in radiators where it is desired to utilize the groove in the joint surfaces. The aperture 84 having been formed, a leak sealing medium is injected through the aperture 84 into groove 83 and thence into the interthread spaces so as to seal the leak as heretofore explained. Thereafter the aperture 84 may be sealed in any of the manners heretofore described.

It is also to be noted that if for any reason it is desired to disassemble the radiator sections the apparatus of the present invention may be used to form an aperture 84 leading to the threaded surfaces and a penetrating oil may be forced between the threaded surfaces to loosen the same if they have become badly rusted in position.

It will therefore be perceived that the present invention provides a single apparatus which may be used to carry out any of the methods of the four applications heretofore identified. This apparatus can be used to seal leaks in threaded joints without withdrawing or changing the pressure existing interiorly of the joint, and therefore without withdrawing the joint from its normal service, and while it is preferred that one of the elements of the threaded joint be preliminarily provided with a groove, or groove section, as heretofore explained, the apparatus is equally available for sealing a leak without the preliminary provision of the internal groove or groove section. If, as explained in our application Serial No. 704,738, the drilling of the aperture in a joint not provided with an internal groove or groove section requires a reaming operation to be performed, the combined jig and guide member illustrated in Fig. 1 may be removed and replaced by a second element of the same character with the guide opening thereof of slightly larger diameter to receive and guide the drill of slightly larger diameter that is to effect the reaming operation.

Likewise the apparatus may be used for injecting a penetrating oil to loosen rusted threaded surfaces, and while here also the preliminary groove or groove section is preferably provided, the apparatus is equally available for use where no such groove or groove section is provided.

Furthermore, the apparatus of the present invention provides for the metallic sealing of the aperture formed by the drilling operation when desired, so that a fluid-tight closure of the aperture may be obtained to enable the reuse of the joint elements, whether the aperture has been formed for injecting a sealing medium or a penetrating oil into the joint.

The apparatus is simple, compact, relatively light in weight, and inexpensive in character. It does not require the use of highly skilled labor for its manipulation, and it is flexible in service because the clamping and retaining means thereof possess both flexibility and adjustability so that the apparatus may be used in connection with threaded joints of a wide variety of sizes, shapes, constructions, and character. If, when an internal groove or groove section is used, said groove is always disposed at a standardized distance from the end of the outer joint element, said apparatus provides for the alinement of the drill with said groove or groove section without additional knowledge as to the location of the latter. On the other hand, if different sizes or characters of joints are provided with grooves at different distances from the ends of the outer joint elements, the present apparatus provides for the ready replacement of positioning elements 27 of different thicknesses or shape so that the drill may be properly alined with the internal groove for each predetermined location of the groove with respect to the end of the outer joint element.

The present invention enables the rig to be rigidly clamped to the joint element and without removal or displacement thereof each of the succeeding operations to be performed on the joint can be carried on since the threaded aperture 30 provides for the mounting in operative position of the drill jig and guide member, the injection nozzle, and either or both of the rotary calking and peening tools, or any one or more of the foregoing, depending upon the particular procedure to be followed.

The drill jig and guide member not only guides the drill holder so that the drill will properly enter the internal groove when preliminarily provided, but the drill itself is restrained adjacent its entry into the outer joint element so that lateral stresses are minimized and the danger of breakage of the drill is prevented. Furthermore, the construction provides for the positive stopping of the drill when it has advanced to such a position that the drill has passed through the outer joint element to avoid injury of the inner joint element by entry of the drill thereinto. The injection nozzle, when mounted in the aperture 30, is in alignment with the aperture so drilled, and it may also be used as a rotary calking tool as explained, or either or both separate rotary calking and peening tools may be used in the same aperture to effect the sealing of the aperture, either with or without a pin or plug therein, so that by combined pressure and rotary action an effective and fluid-tight seal of the aperture is obtained. Apparatus has also been provided whereby any or all of the operations heretofore described may be carried out where the joint element is of such character that the rig may not be mounted on the outer element of the joint.

While the embodiments of the invention illustrated on the drawings have been described with considerable particularity, it is to be expressly understood that the invention is not restricted thereto, as the same is capable of receiving a variety of mechanical expressions, some of which will now suggest themselves to those skilled in the art, while certain features may be used without other features, and changes may be made in the details of construction, arrangement, proportion, size, etc., without departing from the spirit of this invention. Reference is therefore to be had to the appended claims for a definition of the invention.

What is claimed is:—

1. In an apparatus of the character described, the combination of a clamping member, means for tightly securing said clamping member to the periphery of a joint element, said member being provided with a threaded aperture extending therethrough, and a guide member for a drill and drill holder adapted to be threaded into said aperture until its inner end is pressed firmly against the periphery of the outer element of a threaded joint, said guide member having a cylindrical bore adapted to guide the drill holder and an aperture at its inner end adapted to co-operate directly with and guide the drill.

2. In an apparatus of the character described, the combination of a clamping member, means for tightly securing said clamping member to the periphery of a joint element, said member being provided with a threaded aperture extending therethrough, and a guide member for a drill holder adapted to be threaded into said aperture until its inner end is pressed firmly against the periphery of the outer element of a threaded joint, said guide member having a cylindrical bore adapted to receive and guide the drill holder and said drill holder having an enlargement adapted to engage said guide member to predeterminately limit the extent to which the drill may enter said threaded joint.

3. In an apparatus of the character described, the combination of a clamping member, means for tightly securing said clamping member to the periphery of a joint element, said member being provided with a threaded aperture extending therethrough, a guide member for a drill holder adapted to be threaded into said aperture until its inner end is pressed firmly against the periphery of the outer element of a threaded joint, a drill holder adapted to be mounted in said guide member and guided thereby, said drill holder and guide member having cooperating stops to predetermine the extent to which the drill may project from said guide member to enter said joint, and means for releasably retaining a drill in said drill holder whereby said guide member may be engaged with the periphery of the outer element of said joint adjacent the end thereof when said stop members are in contact and said retaining means are released and the drill may be engaged with the periphery of the inner joint element and then secured fixedly in said holder to predetermine the projection of said drill from said guide member to the thickness of said outer joint element.

4. In an apparatus of the character described, the combination of a clamping member, means for tightly securing said clamping member to the periphery of a joint element, said member being provided with a threaded aperture extending therethrough, a guide member for a drill and drill holder adapted to be threaded into said aperture until its inner end is pressed firmly against the periphery of the outer element of a threaded joint, and means mounted on said clamp bar to engage a shoulder on said outer joint element and predetermine the distance from the end of said outer joint element at which the drill pierces said outer element.

5. In an apparatus of the character described, the combination of a clamping member, means for tightly securing said clamping member to the periphery of a joint element, said member being provided with a threaded aperture extending therethrough, and an injection nozzle adapted to be threaded into said aperture until its inner end is pressed firmly against the periphery of the outer element of a threaded joint, said injection nozzle having a passage extending therethrough and provided with means at the outer end thereof for the attachment of an injection device thereto.

6. In an apparatus of the character described, the combination of a clamping member, means for tightly securing said clamping member to the periphery of a joint element, said member being provided with a threaded aperture extending therethrough, and an injection nozzle adapted to be threaded into said aperture and provided at its inner end with a hardened and sharpened cutting edge adapted to bite into the metal of the joint element.

7. In an apparatus of the character described, the combination of a clamping member, means for tightly securing said clamping member to the periphery of a joint element, said member being provided with a threaded aperture extending therethrough, an injection nozzle adapted to be threaded into said aperture until its inner end is pressed firmly against the periphery of the outer element of a threaded joint, said nozzle having a passage therethrough, and an injection device comprising a cylinder having an internally threaded bore and a threaded plunger cooperating therewith adapted to be mounted on the end of said injection nozzle.

8. In an apparatus of the character described, the combination of a clamping member, means for tightly securing said clamping member to the periphery of a joint element, said member being provided with a threaded aperture extending therethrough, and a calking tool adapted to be threaded into said aperture and having a hardened and sharpened inner edge adapted by combined pressure and rotary action to deflect inwardly the metal within the circle engaged by said sharpened edge.

9. In an apparatus of the character described, the combination of a clamping member, means for tightly securing said clamping member to the periphery of a joint element, said member being provided with a threaded aperture extending therethrough, and a peening tool adapted to be threaded into said aperture and having a concave inner end adapted by combined pressure and rotary action to compress inwardly and compact the metal within the circle engaged by the concavity in the end of said tool.

10. In an apparatus of the character described, in combination with mounting means adapted to be secured to the periphery of a threaded joint, a combined jig and guide member for a drilling tool including a member having an exteriorly threaded shank and an interiorly cylindrical bore and provided in the end thereof with an aperture adapted to receive and guide a drill, and a drill holder adapted to be received and guided in said cylindrical bore and provided with a radial projection adapted to engage the end of said guide member to predetermine the extent of projection of the drill through said aperture.

11. In an apparatus of the character described, in combination with mounting means adapted to be secured to the periphery of a threaded joint, an injection nozzle provided with an exteriorly threaded shank and having at its inner end a hardened and sharpened edge whereby said nozzle when threaded into said mounting means will bite into the metal with which said nozzle is engaged.

12. In an apparatus of the character described, in combination with mounting means adapted to be secured to the periphery of a threaded joint, a rotary calking tool provided with an exteriorly threaded shank and having at its inner end a hardened and sharpened edge to bite into and deflect the metal which lies within the circle engaged by said sharpened edge.

13. In an apparatus of the character described, in combination with mounting means adapted to be secured to the periphery of a threaded joint, a rotary peening tool provided with an exteriorly threaded shank and having a concave inner end adapted by combined pressure and rotary action to deform and compress the metal which lies within the circle engaged by the end thereof.

14. In an apparatus of the character described, the combination of a clamping member provided with a threaded aperture adapted to receive a drilling jig and guide member, an injection nozzle, a rotary calking tool or a rotary peening tool, and means for adjustably clamping said member to the periphery of an element of a threaded joint.

15. In an apparatus of the character described, the combination of a clamping member provided with a threaded aperture adapted to receive a drilling jig and guide member, an injection nozzle, a rotary calking tool or a rotary peening tool, and means for adjustably clamping said member to the periphery of an element of a threaded joint, said aperture being disposed at an acute angle to said clamping member.

16. In an apparatus of the character described, the combination of a clamping member provided with a threaded aperture adapted to receive a drilling jig and guide member, an injection nozzle, a rotary calking tool or a rotary peening tool, and means for adjustably clamping said member to the periphery of an element of a threaded joint, said last-named means including a flexible chain, means for attaching one end of said chain to one end of said clamping member, and adjustable means on the other end of said chain and cooperating with the other end of said clamping member for tightening said chain into gripping contact with said element of the threaded joint.

17. In an apparatus of the character described, the combination of a clamping member provided with a threaded aperture adapted to receive a drilling jig and guide member, an injection nozzle, a rotary calking tool or a rotary peening tool, and means for adjustably clamping said member to the periphery of an element of a threaded joint, said clamping means including a flexible chain composed of alternately disposed single and double links, said clamping member having a recess adjacent one end thereof adapted to receive a double link and an open-ended slot at the bottom of said recess adapted to receive a single link whereby said chain may be locked in said recess by engaging a single link in said slot and a double link in said recess, a threaded stem attached to the opposite end of said chain and extending through an aperture in said clamping member, and an adjustable nut on said stem and cooperating with said clamping member for tightening said chain into gripping contact with the periphery of said joint element.

18. In an apparatus of the character described, the combination of a clamping bar, an adjustable device cooperating therewith for securing said bar in gripping contact with the periphery of a joint element, a transverse bar extending substantially at right angles to said first named bar, a threaded aperture adjacent one end of said transverse bar adapted to receive a drilling jig and guide member, an injection nozzle, a rotary calking tool or a rotary peening tool, and means extending through the opposite end of said transverse bar and cooperating with the periphery of said joint element for preventing tilting of said transverse bar with respect to said first named bar.

19. In an apparatus of the character described for injecting a fluid between the threaded surfaces of a threaded joint one of the elements of which is provided with an interior circumferential groove or groove section, a clamping member adapted to be secured to the periphery of the outer element of said joint, means cooperating with said member for tightly clamping the same in position, said member having a threaded aperture therethrough adapted to receive a drilling jig and guide member, and means on said clamping member adapted to cooperate with the end of said outer joint element for positioning said clamping member so that the drill guided by said guide member will pierce said outer joint element at said circumferential groove or groove section.

20. In an apparatus of the character described, the combination of a clamping member and adjustable flexible means cooperating therewith for securely clamping said member in contact with the periphery of an element of a threaded joint, said clamping member having a threaded aperture extending therethrough adapted to interchangeably receive a drilling jig and guide member, an injection nozzle, a calking tool or a peening tool whereby without removing said clamping member an aperture may be predeterminately drilled in the outer element of said joint at a location determined by the guide member mounted in said aperture, a fluid may be injected into the interthread spaces by an injection device mounted in said aperture, and said aperture may be sealed by a tool threaded into said aperture.

EUGENE C. FURMAN.
EDMUND F. HEARD.